July 26, 1932. B. D. BEDFORD 1,869,128
POWER MEASURING AND TELEMETERING APPARATUS Filed March 10, 1931

Inventor:
Burnice D. Bedford,
by
His Attorney.

Patented July 26, 1932

1,869,128

UNITED STATES PATENT OFFICE

BURNICE D. BEDFORD, OF SCHENECTADY, NEW YORK, ASSIGNOR TO GENERAL ELECTRIC COMPANY, A CORPORATION OF NEW YORK

POWER MEASURING AND TELEMETERING APPARATUS

Application filed March 10, 1931. Serial No. 521,503.

My invention relates to electric measuring and telemetering apparatus of the type in which the thermal effect of electric currents which are proportional to factors entering into the quantity to be measured are utilized. Apparatus of this general type is described in British Patent 119,338, Fawssett. In said patent thermocouple temperature detecting and transmitting apparatus is employed in conjunction with heating units responsive to different electrical quantities to be measured. The power available from the thermocouples is in general too feeble to serve for sending currents over transmitting circuits of any appreciable length or resistance, and the choice of receiving instruments for such a system is limited to one sensitive to feeble currents. The accuracy of this system also requires that there shall be no change in the resistance of the transmitting circuit. The main object of my invention is to provide apparatus for accomplishing the same general purpose as the Fawssett apparatus but which is not subject to the above-mentioned limitations.

In carrying my invention into effect I employ vacuum tube means controlled by suitable temperature responsive detecting means for producing transmitting currents which may be of sufficient magnitude for any general telemetering condition liable to be met with in practice. I also cause the telemetering current to produce an auxiliary thermal balancing effect upon the thermal measuring means in such a way that the accuracy of operation of the transmitting apparatus is independent of changes in resistance or characteristics of the transmitting circuit or transmitting tube.

The features of my invention which are believed to be novel and patentable will be pointed out in the claims appended hereto. For a better understanding of my invention reference is made in the following description to the accompanying drawing which illustrates in Fig. 1 apparatus embodying the invention as arranged to measure the power flowing in a direct current circuit, and Fig. 2 illustrates the invention as applied to the measurement of alternating current power.

Figure 1:
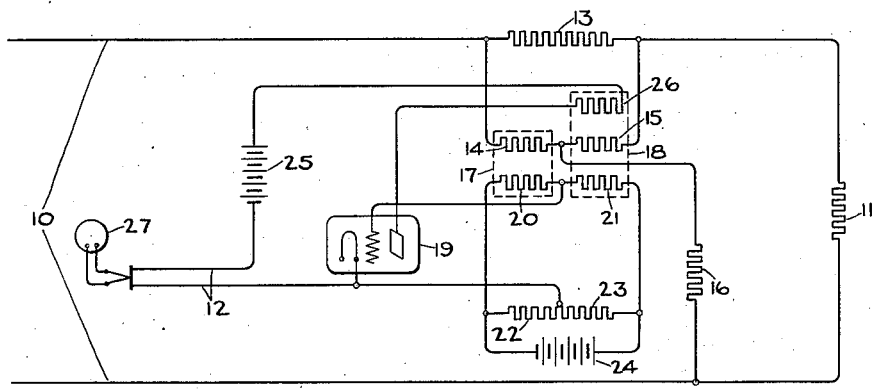
Figure 2:
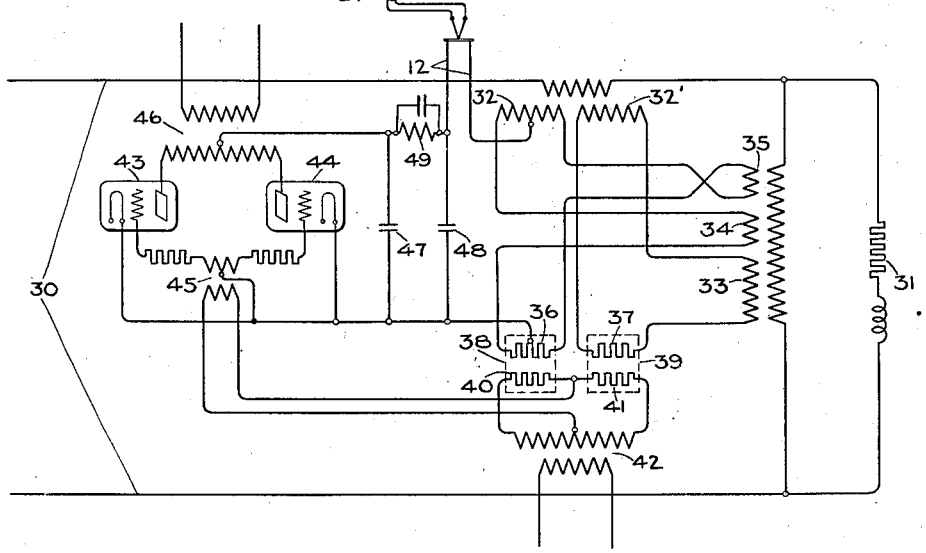

In Fig. 1 I have represented a direct current circuit 10 supplying a load indicated at 11. My invention is here employed to obtain a small direct current proportional to the direct current load 11, which current may be transmitted over a telemetering circuit indicated at 12. When I say "proportional" I do not necessarily mean proportional to the first power. In Fig. 1 the current in the telemetering circuit is proportional to the square root of the power flowing to load 11. At 13 I have represented a shunt in the circuit supplying load 11 and connected across this shunt are a pair of resistance heating elements 14 and 15 contained in separate heating chambers 17 and 18, indicated in dotted lines. From a point between heating elements 14 and 15, a potential circuit containing a high resistance 16 goes to the other side of the load circuit. If now we represent the current in the load circuit by I and the voltage of this, circuit by E, it is seen that a current will flow in resistance element 14, which is proportional to $E+I$ and the current in resistance element 15 will be proportional to $E-I$. The heating effect of these currents will be $(E+I)^2$ and $(E-I)^2$ respectively, and the difference in their heating effects will be proportional to $$[E^2+2EI+I^2]-[E^2-2EI+I^2]=4EI$$

or proportional to the instantaneous power supplied to load 11.

A vacuum tube bridge circuit controlled by and measuring the difference in temperature of the two heating chambers will now be explained. 19 represents a vacuum tube having its filament and grid connected across a Wheatstone bridge containing resistance arms 20, 21, 22 and 23, and supplied by a direct current battery 24. Arm 20 is contained within the heating chamber 17 in close proximity to heating element 14. Arm 21 is contained in heating chamber 18 in close proximity to heating element 15. The resistances 20 and 21 will have positive temperature coefficients of resistance and the bridge will be balanced when the temperature of 20 and 21 are equal. Now, any unbalancing of the bridge due to a higher temperature of resistance 20 than that of resistance 21 will provide a voltage difference between the filament and grid of tube 19 and it will produce or pass current. The plate circuit of the tube is supplied from a battery 25 and includes a resistance heating element 26 in heating chamber 18 and the telemetering circuit 12. Heating element 26 supplied by the vacuum tube adds its heat to that of 15, thereby reducing the difference of temperature between 20 and 21 and reducing the bias on the vacuum tube and in turn reducing the plate current until a steady condition is reached where the tube current is proportional to the square root of the power supplied to load 11. If this current is measured by a thermocouple instrument as indicated at 27, the reading will be directly proportional to the first power of the power supplied to 11. The sensitivity of the bridge circuit may be made as great as desired. The currents in the heaters may be kept at low values and the action made quickly responsive to changing conditions by properly proportioning the dimensions and thermal conditions. The operation is independent of change in the characteristics of the tube and of the impedance of the telemetering circuit.

In Fig. 2 the invention is applied to an alternating current power circuit 30 supplying a load indicated at 31. A current transformer having secondary windings 32 and 32' is connected in the power line and a potential transformer having three secondary windings 33, 34 and 35 is connected across the power line. The secondary winding sections 34 and 35 are equal and the sum of their voltages equals the voltage across the secondary section 33. These transformers supply two heating resistances 36 and 37 in heating chambers 38 and 39 in such a way that resistance 36 is traversed by a current proportional to $E-I$ and resistance 37 is traversed by a current proportional to $E+I$, where E and I represent the voltage and current respectively of line 30. For this purpose current transformer section 32' is connected in series with potential transformer section 33 and resistance 37 so that the power components proportional to E and I are in phase in this circuit. Current transformer section 32 is connected in series with the two potential transformer sections 34 and 35 and with resistance 36 so that the power components proportional to E and I are 180 degrees out of phase in this circuit. The difference in the heating effects of elements 36 and 37 will therefore be proportional to E I times the power factor of the circuit or proportional to the power. Heaters 36 and 37 are caused to influence resistances 40 and 41 contained in chambers 38 and 39 respectively, and connected in an alternating current bridge circuit supplied by a transformer 42 the secondary winding of which comprises a portion of the bridge. This bridge controls the grid circuits of a pair of tubes 43 and 44 through a transformer 45 in accordance with the unbalance produced by the difference in temperature of 38 and 39. The plate circuits of the tubes are supplied by alternating current through a transformer 46 and the connections are such that the tubes rectify both half waves and supply the rectified current to a telemetering circuit 12. Condensers 47 and 48 are connected across the tubes and direct current circuit and a reactance 49 is connected in the direct current circuit between the condenser connections. This arrangement permits the rectification to take place and smooths out the ripples in the direct current. If now the tubes are biased to pass current in accordance with the grid bias supplied from the temperature controlled bridge the direct current supplied will be proportional to the square root of the power supplied to the load 31.

The direct current in the telemetering circuit flows through resistance 36. The connections between the direct current circuit and the alternating current circuit supplying resistance 36 are made at the midpoints of resistance 36 and current transformer section 32. The direct current therefore divides equally between the two parallel circuits between these points and flows in opposite directions in equal transformer sections and therefore has no effect on the transformer action of the current and potential transformers. Also, the connections are such that the alternating current potential between these connecting points is zero and no alternating current flows from the transformer secondaries out into the direct current telemetering circuit. The direct current flowing in resistance 36 increases until it contributes sufficient heating effect to nearly make up for the difference in the alternating current heating effects in 36 and 37 and bring about a balanced regulating action on itself through the bridge and tubes. The current flowing in the telemetering circuit 12 will therefore be proportional to the square root of the power flowing to load 31. The heating effect supplied by this direct current in resistance 36 will be proportional to the first power of such load and a thermocouple instrument such as represented at 27 will indicate such load. The particular means described for detecting the temperature differences of the two heating receptacles may be varied considerably. This and such other modifications and uses of the invention as will occur to those skilled in the art are intended to be included within the scope of the appended claims.

What I claim as new and desire to secure by Letters Patent of the United States is:

1. In combination with an electric circuit, thermal means responsive to electrical conditions of such circuit for producing a temperature difference proportional to some quantity of the circuit which it is desired to measure, electric control means responsive to the magnitude of such temperature difference, and vacuum tube means biased by said control means for producing a current proportional to such quantity, said thermal means being influenced by said current in such manner as to diminish the temperature difference which is produced therein in response to the electrical conditions of the circuit.

2. In combination with an electric circuit, a pair of electric heaters, means for energizing said heaters by currents derived from said circuit in a manner to produce a temperature difference between them which is proportional to some quantity of the circuit which it is desired to measure, means for obtaining a control voltage which is proportional to the temperature difference of said heaters, vacuum tube means controlled by said voltage for producing a current which is proportional to the quantity which it is desired to measure, and means for reducing the temperature difference between said electric heaters in proportion to the current produced by said vacuum tube means.

3. In combination with an electric circuit, a pair of electric heating units, means for energizing said units by currents derived from said circuit in a manner to produce a temperature difference between them which is proportional to some quantity of the circuit which it is desired to measure, vacuum tube means, means for controlling said vacuum tube, means in response to the temperature difference of said heating units to produce a current proportional to such difference, and means for energizing the electric heating unit which operates at the lower temperature by a heating current produced by the vacuum tube means.

4. Electric measuring apparatus comprising a pair of electric heating elements so energized as to produce a temperature difference between them which is proportional to some quantity which it is desired to measure, a bridge circuit having a pair of resistance arms in thermal contact with said pair of electric heating elements for obtaining a voltage proportional to their temperature difference, vacuum tube means controlled by said voltage and producing a current proportional thereto, said current being employed to heat one of said elements and reduce the temperature difference between them, and means for measuring the heating effect of said current.

5. Electric measuring apparatus comprising electric thermal means for producing a temperature difference proportional to some quantity which it is desired to measure, vacuum tube means for producing a measurement current, and means for controlling said tube means in accordance with the temperature difference produced by said thermal means.

6. In combination with an electric circuit, apparatus for obtaining a measurement of some quantity of such circuit comprising a pair of thermal electric units, means for energizing said units from the circuit to produce heating effects in the two units the difference of which is proportional to such quantity, means responsive to the difference in temperature of said units, means controlled by said temperature responsive means for producing a current proportional to such temperature difference, means for heating the thermal unit which operates at the lowest temperature by such current, and a measuring instrument responsive to such current.

7. In combination with an electric power circuit, thermal means responsive to the current and voltage of said circuit for producing a temperature difference which is proportional to the power flowing in said circuit, vacuum tube means, means for controlling said vacuum tube means in response to such temperature difference to produce a current proportional to the square root of the power flowing in said circuit, the current produced by said tube means being employed to influence said thermal means to reduce the temperature difference which is produced therein in response to the current and voltage of the power circuit.

8. In combination with an electric power circuit, a pair of electric heating units, means for energizing one of said units by a current which is proportional to the sum of the voltage and current of said circuit, means for energizing the other of said units by a current which is proportional to the difference of the voltage and current of said circuit, vacuum tube means, means for controlling said tube means in response to the difference in temperature of said heating units to produce a current proportional to the square root of the power flowing in said circuit, and means for causing the current from the tube means to heat the heating element which is energized by a current proportional to the difference of the voltage and current in said power circuit.

9. In combination with a power circuit, a pair of electric heating chambers, means for heating one chamber by a current derived from the power circuit which is proportional to the sum of the voltage and current therein, means for heating the other chamber by a current derived from the power circuit which is proportional to the difference of the voltage and current therein, a vacuum tube for supplying current to heat the last mentioned chamber, said tube supplying no current when the chambers are at the same temperatures, and means responsive to the difference in temperatures of said chambers for controlling the output of said vacuum tube.

10. In combination with an alternating current circuit, apparatus for measuring the power of said circuit, comprising current and potential transformers connected thereto, a pair of heating units energized from said transformers in such a way as to produce heating effects the difference of which is proportional to the power of said circuit, means for producing an alternating voltage proportional to the temperature difference of said heating units, a pair of vacuum tubes supplied by alternating current and controlled by said alternating voltage so as to produce a direct current proportional to said voltage, connections for supplying such direct current to one of said heating units, and a measuring instrument influenced by said direct current.

11. In combination with an alternating current circuit, apparatus for obtaining a measurement of some characteristic of such circuit comprising a pair of electric heating resistances, transformer means deriving currents from said circuit for heating said resistances such that the difference in the heating effects thereof are proportional to such quantity, vacuum tube means supplying direct current to one of said resistances to reduce the temperature difference between the pair of resistances, means responsive to the temperature difference of said resistances for controlling the heating current supplied by the tube means, and a measuring instrument responsive to the current supplied by the tube means.

In witness whereof I have hereunto set my hand.

BURNICE D. BEDFORD.